United States Patent
Posa et al.

(10) Patent No.: US 7,317,872 B1
(45) Date of Patent: Jan. 8, 2008

(54) REMOTE MICROPHONE AND RANGE-FINDING CONFIGURATION

(76) Inventors: John G. Posa, 1204 Harbrooke, Ann Arbor, MI (US) 48103; Barry H. Schwab, 5298 Cedarhurst Dr., West Bloomfield, MI (US) 48322

( * ) Notice: Subject to any disclaimer, the term of this patent is extended or adjusted under 35 U.S.C. 154(b) by 0 days.

(21) Appl. No.: 09/431,510

(22) Filed: Nov. 1, 1999

Related U.S. Application Data

(63) Continuation of application No. 08/949,070, filed on Oct. 10, 1997, now Pat. No. 5,995,763.

(51) Int. Cl.
G03B 13/36 (2006.01)
G01S 15/00 (2006.01)

(52) U.S. Cl. .......... 396/57; 396/105; 367/99; 367/107

(58) Field of Classification Search .......... 396/56–59, 396/105, 312; 348/211, 214, 163, 169, 348; 352/140, 34, 1; 367/99, 107
See application file for complete search history.

(56) References Cited

U.S. PATENT DOCUMENTS

| | | | |
|---|---|---|---|
| 4,239,356 A | 12/1980 | Freudenschuss et al. | 354/23 |
| 4,290,685 A | 9/1981 | Ban | 354/266 |
| 4,534,629 A | 8/1985 | Bogle et al. | 352/140 |
| 4,550,343 A | 10/1985 | Nakatani | 358/229 |
| 4,601,557 A | 7/1986 | Bogle et al. | 352/140 |
| 4,636,052 A | 1/1987 | Bowsher | 354/410 |
| 4,816,855 A | 3/1989 | Kitaura et al. | 354/415 |
| 4,831,438 A | 5/1989 | Bellman, Jr. et al. | 358/108 |
| 4,884,094 A | 11/1989 | Kitaura et al. | 354/412 |
| 4,918,476 A | 4/1990 | Tejima | 354/221 |
| 4,928,179 A | 5/1990 | Takahashi et al. | 358/210 |
| 4,980,871 A | 12/1990 | Sieber et al. | 367/127 |
| 5,012,335 A | 4/1991 | Cohodar | 358/108 |
| 5,038,162 A | 8/1991 | Tejima | 354/221 |
| 5,076,686 A | 12/1991 | Preston | 352/140 |
| 5,092,670 A | 3/1992 | Preston | 352/140 |
| 5,159,375 A | 10/1992 | Taniguchi et al. | 354/400 |
| 5,172,155 A | 12/1992 | Kosaka | 354/403 |
| 5,179,421 A | 1/1993 | Parker et al. | 356/152 |
| 5,206,721 A | 4/1993 | Ashida et al. | 358/85 |
| 5,231,483 A | 7/1993 | Sieber et al. | 358/125 |
| 5,268,734 A | 12/1993 | Parker et al. | 356/152 |
| 5,283,610 A | 2/1994 | Sasaki | 396/57 |
| 5,361,115 A | 11/1994 | Ohtsuka et al. | 354/400 |
| 5,384,594 A | 1/1995 | Sieber et al. | 348/169 |
| 5,387,955 A | 2/1995 | Cocca | 396/56 |
| 5,432,597 A | 7/1995 | Parker et al. | 356/139.06 |
| 5,471,296 A | 11/1995 | Parker et al. | 356/139.06 |
| 5,512,941 A | 4/1996 | Takahashi et al. | 348/81 |
| 5,570,177 A | 10/1996 | Parker et al. | 356/139.06 |
| 5,572,317 A | 11/1996 | Parker et al. | 356/139.06 |
| 5,594,498 A | 1/1997 | Fraley | 348/158 |

OTHER PUBLICATIONS

ParkerVision, Inc. "CameraMan" Brochure, *The Ultimate Videomaking System*.

*Primary Examiner*—W. B. Perkey
(74) *Attorney, Agent, or Firm*—Giffford, Krass, Groh, Sprinkle, Anderson & Citkowski, PC

(57) ABSTRACT

Remotely operable electronic apparatus are applied to distance measurement and picture/sound recording wherein, for example, a remote unit may be equipped with a microphone and an active range finder coupled to an auto-focussing capability. In one embodiment a camera is adapted to transmit a signal to the remote unit which returns a signal enabling the camera to accurately calculate distance and adjust focus in accordance with time-of-flight. The transponder preferably forms part of a wireless microphone, with the signal transmitted by the camera being preferably acoustical in nature. The acoustical signal transmitted by the camera is preferably modulated onto a return RF signal, enabling at least a portion of the audio circuitry associated with voice modulation to be used for the purpose of modulating the ranging signal, thereby realizing a very efficient and economical approach to remote sound detection and active ranging finding.

15 Claims, 5 Drawing Sheets

REMOTE MICROPHONE AND RANGE-FINDING CONFIGURATION

This application is a continuation of application Ser. No. 08/949,070, filed Oct. 10, 1997, now U.S. Pat. No. 5,995,763.

FIELD OF THE INVENTION

This invention relates generally to remotely operable electronic apparatus. In particular, the invention may be applied to distance measurement and picture/sound recording wherein, for example, a remote unit may be equipped with a microphone and an active range finder coupled to an auto-focussing capability.

BACKGROUND OF THE INVENTION

Picture recording apparatus such as video recorders have become extremely sophisticated in recent years, and now produce high-resolution images with great clarity even in consumer products. Modern camcorders now include a high-resolution recording medium, and may feature an electronic zoom, image stabilization and other advanced capabilities.

As improvements in image quality have advanced, however, audio recording quality has lagged behind. Although the audio recording circuits associated with such recorders offer high fidelity, and typically, stereophonic sound, the microphone is fixed at the location of the camera body. As such, when the audio source is located any appreciable distance from the recording unit, the effect of distance, wind and other factors significantly degrade sound quality.

One solution to this problem is through the use of a remote microphone, which may be obtained from a number of sources, including wireless versions. Depending upon cost, such devices offer varying sophistication, and, at the high end, afford very reliable and clear reception from a remote audio source.

As camera manufacturers presently do not offer integrated remote microphones with their picture recording units, however, consumers must resort to independent sources for such devices. One consequence is an operational configuration wherein a number of functional units are interconnected by different wires, which tend to get in the way or become entangled. For example, the typical commercial remote microphone comes with a wireless transmitter, adapted to be carried by an individual to be recorded. The transmitter communicates with a wireless receiver unit which interconnects to the camera by way of an audio cable. The receiver unit is often worn on the person of the individual carrying the camera, with the wire between the receiver and camera being dressed on or around this individual as well.

The need remains, therefore, for an integrated camera and wireless remote microphone arrangement, for use with either moving or still imagery, which enables a microphone to be docked for non-remote use, and removed for remote use without the need for equipment reconfiguration. The need also exists for a remote microphone including circuitry in support of an auto-focusing capability, preferably through the use of an active ranging function to minimize at least some of the problems now experienced with passive auto-focus systems. Ideally, the circuitry associated with the remote microphone and the auto-focusing capability will be at least partially redundant so as to realize an elegant, cost-effective configuration. There is yet a further need for a range-finding arrangement wherein a relatively slow signal such as an acoustic signal is utilized and at a least a first direction, with an electromagnetic signal being preferably used in a return path carrying a representation of the acoustic signal in modulated fashion to realize an inexpensive approach to various distance-measurement functions including surveying, and so forth. This latter need may also be served according to the invention through the integration of a remote microphone along with the range-finding function to permit one- or two-way voice communication during a measurement operation.

SUMMARY OF THE INVENTION

One embodiment of the present invention uses time-of-flight distancing to focus a camera, whether for still or motion picture taking. Broadly, a camera is adapted to transmit a signal to a remote transponder unit which returns a signal enabling the camera to accurately calculate distance and adjust focus accordingly. In this embodiment, the transponder preferably forms part of a wireless microphone, the signal transmitted by the camera being acoustical in nature. A return signal is preferably sent back to the camera in RF form, enabling distance to be determined as a function of delay. The acoustical signal transmitted by the camera is preferably modulated onto the return RF signal, enabling at least a portion of the audio circuitry associated with voice modulation to be used for the purpose of modulating the ranging signal, thereby realizing a very efficient and economical approach to remote sound detection and active ranging finding. Even in the absence of remote sound detection, the inventive combination of an acoustical signal in a first direction modulated onto an RF carrier in the opposite direction represents a cost-effective solution to other distance-measurement applications such as dimensioning, surveying and so forth.

DETAILED DESCRIPTION OF THE INVENTION

According to one aspect of this invention, a remote unit incorporates a microphone while providing, in combination, an optional active distance ranging function, enabling an individual or other audio source to be automatically focussed in accordance with time-of-flight principles. As such, not only does the invention provide a more faithful audio signal, but in addition, the use of active ranging solves problems associated with passive auto-focus systems, such as foreground disturbances and the frequent inability to distinguish between desired subject matter and background scenery.

Figure 1A:
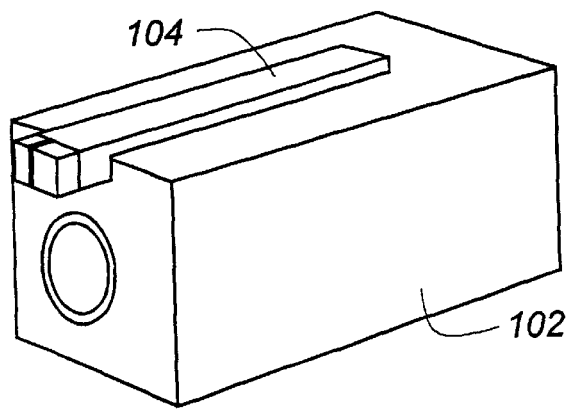
FIG. 1A illustrates, from an oblique perspective, a camera and removable remote unit according to the invention.

In a preferred physical configuration of this embodiment, a camera is provided with a docking arrangement to receive the remote unit, as shown in FIG. 1A. Although FIGS. 1 and 2 will be described in conjunction with a consumer-type hand-held camcorder, the invention is equally applicable to both moving and still image gathering in industrial and professional configurations as well. Both stereo and mono audio recording are also readily accommodated by the invention, with the remote unit both in its docked and undocked configurations.

In FIG. 1A, a camera 102 has physically received a remote unit 104 containing a microphone, and an electrical path is formed through a set of electrical contacts not visible in this figure between the camera and remote unit. Preferably, in this configuration, with the remote unit 104 docked as shown, certain facilities associated with remote operation are defeated (if activated) to save on battery power, and with the microphone delivering an audio signal to the camera in hard-wired fashion.

Figure 1B:
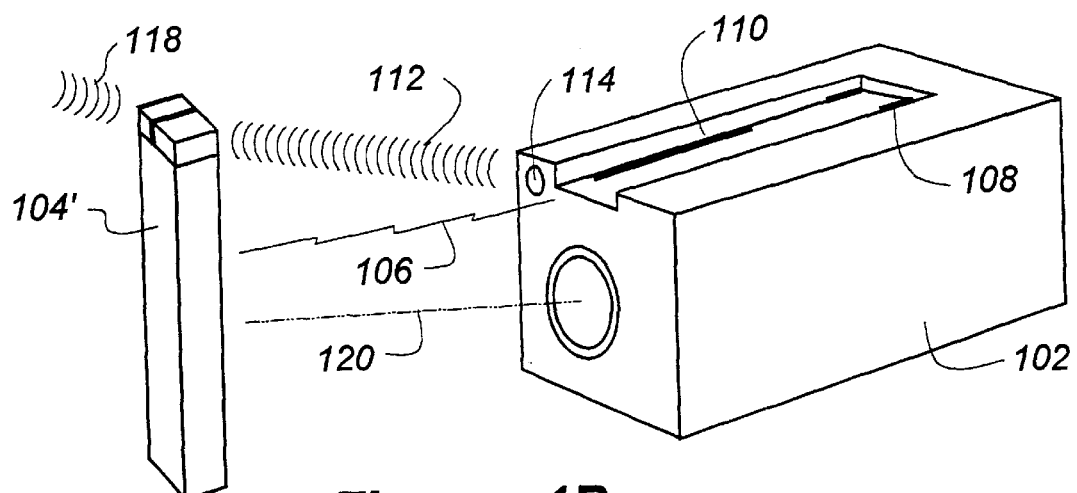
FIG. 1B illustrates the camera of FIG. 1A with the remote unit being detached and available for use both as an audio pick-up and for optional active ranging.

In FIG. 1B, the remote unit, now labeled 104', has been removed from the docking facility provided on the camera 102, facilitating at least a remote microphone capability. Preferably, the wireless link to the camera is RF in nature, and may be use FM or other modulation techniques and any allocated frequency. An optical or IR link may also be used. Thus, with the microphone 104' removed and this mode of operation activated, audio information detected at the microphone is no longer delivered to the camera 102 in hard-wired fashion, but, instead, is transmitted via a wireless signal 106 to the camera body. In the case of an RF signal the camera body may be equipped with an antenna 110 which, conveniently, may be exposed upon removal of the microphone from its docked position. Also shown in FIG. 1B are contacts 108 between the camera 102 and remote unit 104, these contacts having been exposed upon removal of the microphone from the docking station.

Activation of the remote configuration may be carried out through switches on the microphone, or on the camera body, or both. Alternatively, remote operation of the microphone may automatically be activated through the removal of the microphone from its docked position, for example, by sensing an electrical or mechanical condition, thereby foregoing the need for manually operated switches.

According to the remote mode of operation, the unit 104' transmits a wireless signal modulated with audio information in a manner similar to conventional remote microphones, but with several notable differences. Firstly, virtue of the docking capability, a rechargeable battery in the microphone 104 may be automatically charged through the battery of the camera through contacts between the camera and remote unit. Thus, by docking the remote onto the camera 102, a separate recharger stand need not be provided according to the invention. Another difference is that, as discussed above, even with the remote mode of operation having been selected, with the microphone docked onto the body of the camera 102, this mode of operation is preferably automatically defeated to save on battery power.

As a further difference relative to conventional, non-integrated remote microphones, the directionality of the inventive microphone may be made to change from a broad angle of pick-up when docked to a relatively narrow angle of pick-up when removed. This is preferred, since, with the remote unit docked on the camera, particularly with a wide-angle visual field-of-view, a broad range of audio reception may be desirable. In contrast, with the microphone removed and placed relative to an individual being recorded, for example, a relatively narrow angle of reception may be more preferable. As discussed further with reference to FIG. 2, this switching in directionality may be accomplished manually or automatically, as by sensing an electronic or mechanical condition.

In addition to its use as a remote microphone, the unit 104' may also be used in conjunction with a suitably equipped camera to provide an active distance auto-ranging function based upon time-of-flight. Although the same or a different RF frequency or optical link may be used for such purpose, in a preferred embodiment the camera is designed to broadcast an inaudible acoustic signal which is received by the remote unit 104' and relayed back to the camera in wireless fashion for the purpose of performing a distance determination. An acoustic signal such as an ultrasonic signal is preferred due to its relatively lower speed of propagation and greater ease with which a distance calculation may be performed. To limit power consumption, and to simplify the distance determination, a series of acoustic pulses are preferably generated on a periodic basis, having a frequency as low as 20 kHz, and a repetition rate as low as one or fewer pulses power second. Clearly, it is well within the scope of the invention to use higher or lower frequencies and/or repetition rates.

Having received a transmitted signal from a suitably equipped camera, the remote unit 104' relays a transponding signal back to the camera and, based upon the difference between the signal sent and that received, distance is determined within the camera, and an output signal is coupled to an auto-focus circuit, which may be of otherwise conventional design. Although a different RF or optical frequency may be used for the auto-focus signal relayed back to the camera, in the preferred embodiment, the same carrier as that used for the remote microphone is used to carry the auto-ranging signal, thereby obviating the need for a separate transmitter/receiver pair.

Much of the circuitry used to gather and modulate the remote audio signal may be used to gather and modulate the inaudible acoustic signal transmitted by the camera, thus simplifying the circuit configuration while providing for a more cost-effective arrangement. If the audio pick-up used for the remote microphone capability is also capable of receiving the inaudible acoustic signal from the camera used for auto-focus purposes, even the same microphone may be used for both audio pick-up and reception of the ranging signal for auto-focussing purposes.

Figure 2A:
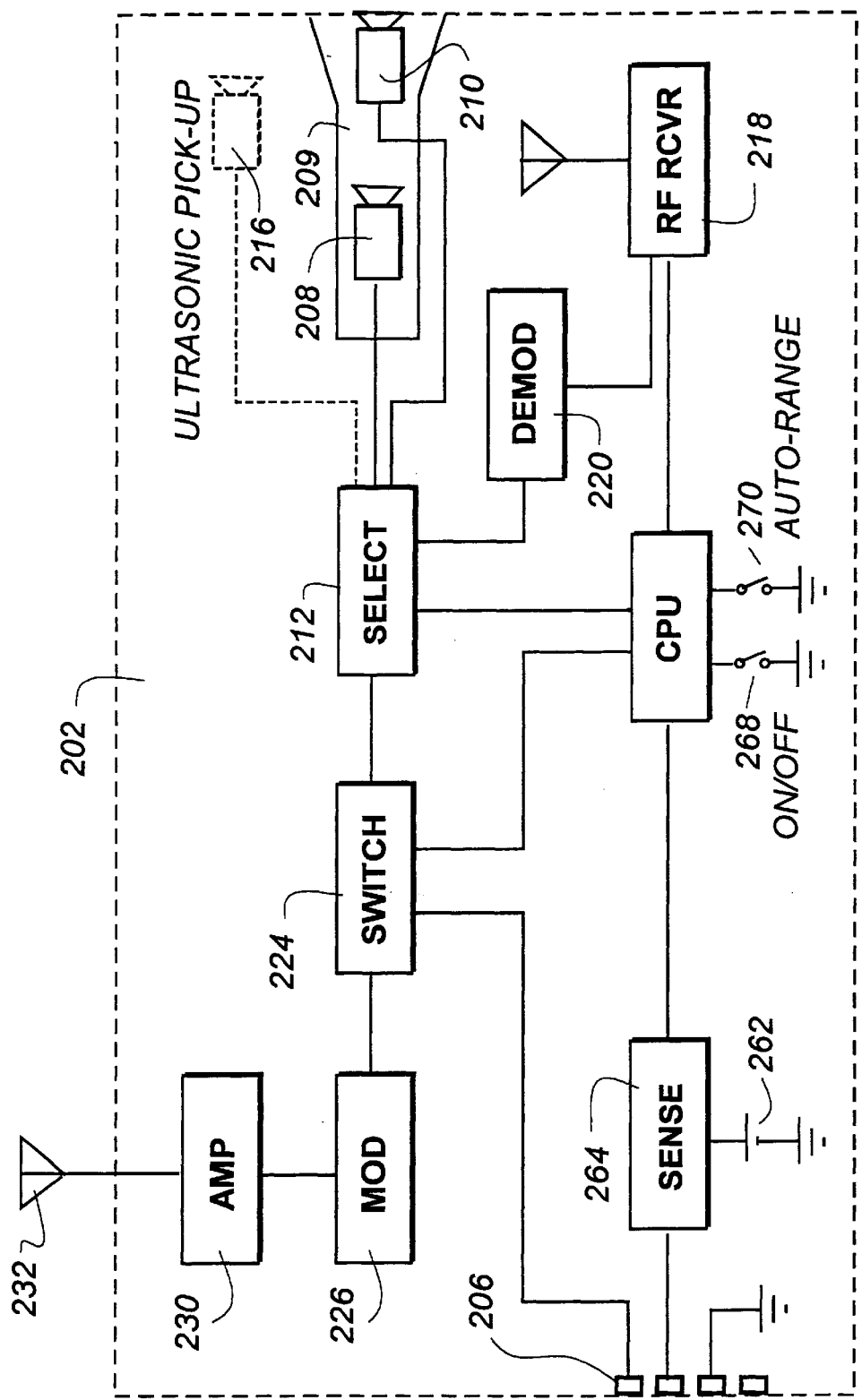
FIG. 2A is a block diagram depicting major electrical subsystems associated with a remote unit of the type shown in FIGS. 1A and 1B.
Figure 2B:
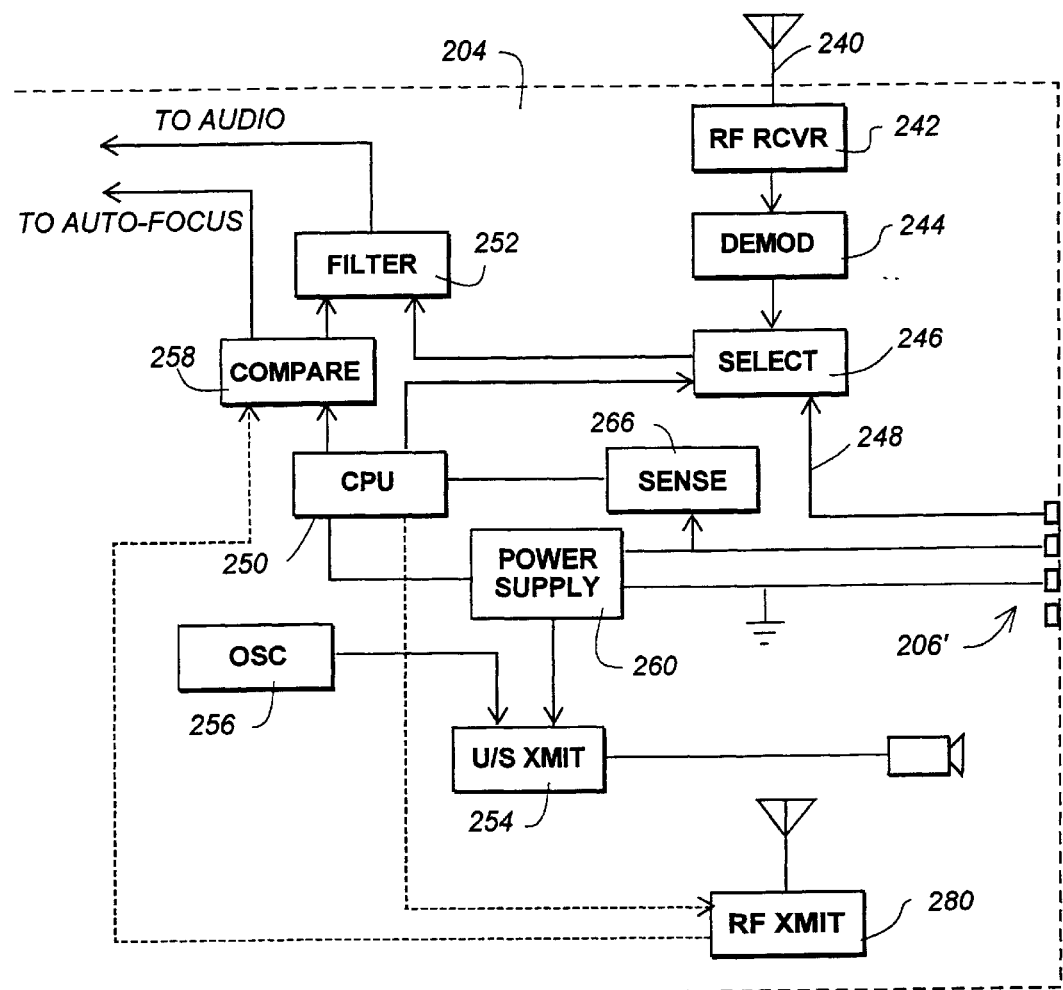
FIG. 2B is a block diagram depicting major electrical subsystems associated with a camera adapted to communicate with the remote unit of FIG. 2A.

FIG. 2A is a block diagram which illustrates major functional components associated with a remote unit according to the invention. A set of electrical contacts 206, which are illustrated commonly between FIGS. 2A and 2B, are used to communicate electrical signals between the camera and the remote unit. An audio pick-up 208, which may be contained within a physical receptacle 209, delivers an audio signal to a selection circuit 212 controlled by a central-processing unit (CPU), which may take the form of a microprocessor or single-chip microcomputer, whether of standard or custom derivation.

A separate microphone 210 may be added and selected by block 212 in order to modify directionality. That is, for a broader angle of reception, with the remote unit docked onto the camera body, for example, the pick-up 210 may be selected, whereas, with the remote unit removed, and if a narrower range of reception is desired, microphone 208 may alternatively be selected. There may also be situations where, depending upon the circumstances, both microphones 208 and 210 may be selected for use. In addition, as discussed above, both mono and stereo operation are accommodated by the invention though only mono pick-ups are shown in the figure.

Depending upon frequency response, microphones such as 208 and/or 210 may be used to receive an inaudible acoustic signal according to the active ranging aspect of the invention. Alternatively, however, a separate transducer 216 may be used to receive the auto-focus related signals, or, as a further alternative, in the event that RF signals are used in both directions, a receiver 218, under control of CPU 214, may be used, with demodulator circuit 220 being used to provide baseband audio, selectable at block 212.

The purpose of switch 224 is to route baseband audio, either through modulator 226 and RF amplifier 230 and out antenna 232 in the event that a wireless mode of operation has been selected or, alternatively, to route the audio signals through the electrical contacts 206 with the remote unit in its docked position. With the remote unit removed, switches 268 and 270 may be used to activate, respectively, all remote-related functions within the remote unit or, the auto-range feature, in particular.

A rechargeable battery 262 is preferably utilized in the remote unit, enabling the battery to be charged when the remote unit is docked through contacts 206 from a power supply contained within the camera. An optional sense capability, shown at block 264, may be provided to sense voltage level, current flow, or some other electrical aspect to determine docking status without having to rely on alternative mechanical actuators. Regardless of how docking status is determined, a signal indicating a docked position may be used to automatically configure switch 224 to ensure that audio signals from the microphone pick-up(s) are routed in hard-wired fashion to the camera.

FIG. 2B is a block diagram showing major electronic circuits associated with a camera adapted to cooperate with the remote unit of FIG. 2A. A corresponding set of contacts 206' are utilized to communicate with the remote unit when docked on the camera body, which is shown with broken line 204. When so docked, audio signals routed through switch 224 are delivered along line 248 to a select module 246 under control of a separate CPU 250 which, again, may take the form of a conventional microprocessor or single-chip microcomputer. The purpose of select switch 246 is to route an incoming audio signal either through the hard-wired contacts 206', as just described, or, alternatively, by way of antenna 240, RF receiver 242, and demodulator 244, in the event that the remote unit has been removed, and with a remote mode of operation having been selected.

As with the remote unit, a sense circuit 266 may be optionally provided as a means for electrically determining whether the remote unit has been docked with respect to the camera body, and a signal from block 266 to the CPU 250 may be used to control select module 246 for the docked and remote modes, as appropriate. Regardless of how the audio signal is derived, it is routed from select block 246 through filter 252, which is used to separate out the auto-focus signal during the remote mode of operation. The filtered-out signal is then fed to a compare circuit 258 to determine time-of-flight. The unfiltered, baseband audio signal is instead output along path 253 for recording purposes. Circuits ordinarily associated with audio recording are not shown in this figure, such as automatic gain-control (AGC) capabilities, stereophonic demultiplexing, and so forth, with the understanding that one of ordinary skill in the art would readily be able to address such extensions under current practice.

In the preferred embodiment, wherein acoustic pulses are utilized for a time-of-flight distance measurement, oscillator 256 generates the pulses, which are fed to a transmitter and waveform shaping circuit 254 before being output through transducer 255. Pulses from the transmitter block 254 are also delivered to a compare circuit 258 fed by the output of filter 252, with the difference between the two signals being used as an indication of the distance to the remote unit. Any number of known techniques may be used to ensure waveforms more amenable to comparison, including various filtering techniques, threshold detection, integration, and so forth. In addition, a variety of known techniques may be used to ensure a more accurate comparison between the base signal and return signal, including synchronous detection, auto-correlation, etc.

Although the time-of-flight of the RF signal from the remote unit to the camera body may be taken into account along with the time required to modulate the distancing signal onto the return RF carrier, in the preferred use of an acoustic ranging signal, a first-order approximation may be realized by assuming that the time required to modulate and return the ranging signal is instantaneous or equal to a constant chosen in conjunction with a typical distance requiring remote microphone operation, such as, say, 20–100 feet, or thereabouts. In the event that two-way RF is used for distance measurement, the time-of-flight of the return RF signal will, of course, need to be taken into account for a more precise measurement.

A power supply 260, which may simply represent the battery pack attached to the camera, is not only used to power electrical subsystems associated with the camera, but, as discussed above, may also be used to recharge a battery 262 in the remote unit, with the sense circuits 266 and 264 being used cooperatively to ensure that battery drain is minimized, particularly when the remote unit is in its docked configuration.

In a preferred alternative embodiment, the invention may further include a plurality of remote units and means whereby the camera may be trained on a particular remote unit while rejecting all others. Different technical approaches are applicable to this aspect of the invention. With audio and distance information being relayed from the remote unit to the camera via an RF signal, one method of singling out a particular remote unit involves the use of a highly directional RF receiving antenna such that only when the camera is pointed substantially in the direction of a particular remote unit will the RF signal from that unit be demodulated and utilized for audio or distance functions. Even in the event that more than one RF signal is received, discrimination electronics may be included in the camera to pass only the strongest signal received or to reject all others. In addition to signal strength, different carrier frequencies and/or identification codes may be incorporated into the transmission between the remote unit and the camera to provide further discrimination competing units through frequency selection and/or decoding.

As an alternative to the use of a directional RF signal, a different form of wireless transmission may be used, preferably one which operates on a line-of-sight basis. For example, a remote unit may transmit an optical signal to be received by the camera and, based upon the existence and/or strength of this signal, the selection of that remote unit may take place. In a preferred arrangement, each remote unit contains a directional infrared (IR) light-emitting diode, and the camera would be equipped with an IR receiver establishing a highly directional path between a particular remote unit and the camera, enabling the camera to single out a particular remote unit on this basis.

The infrared receiver may be located at any forward-looking position on the camera and, advantageously, may also be positioned in the optical path of the camera's image-gathering facilities to ensure that the remote unit is within the picture-taking field-of-view of the camera system so as to enhance the discrimination of a particular remote unit. If an electro-optical image sensor such as a charge-coupled device (CCD) is utilized as the picture-taking element, one or more of the pixels of the array may be used to detect the optical signal from a remote unit, be it infrared or otherwise, thereby obviating the need for a separate detector element.

As with the use of an RF signal for remote-unit discrimination, an optical or infrared signal from the remote unit may also be modulated with information particular to the remote unit responsible for its transmission, including encoded information identifying that remote unit. Audio and/or distance-related information may also be modulated onto an optical carrier. By modulating remote-unit identification information, audio information and auto-ranging information onto the same carrier, whether optical or RF, the invention may accommodate remote microphone and auto-focus distancing functions automatically between plurality of different remote units by simply pointing the camera in the direction of one of the remote units.

Figure 3:
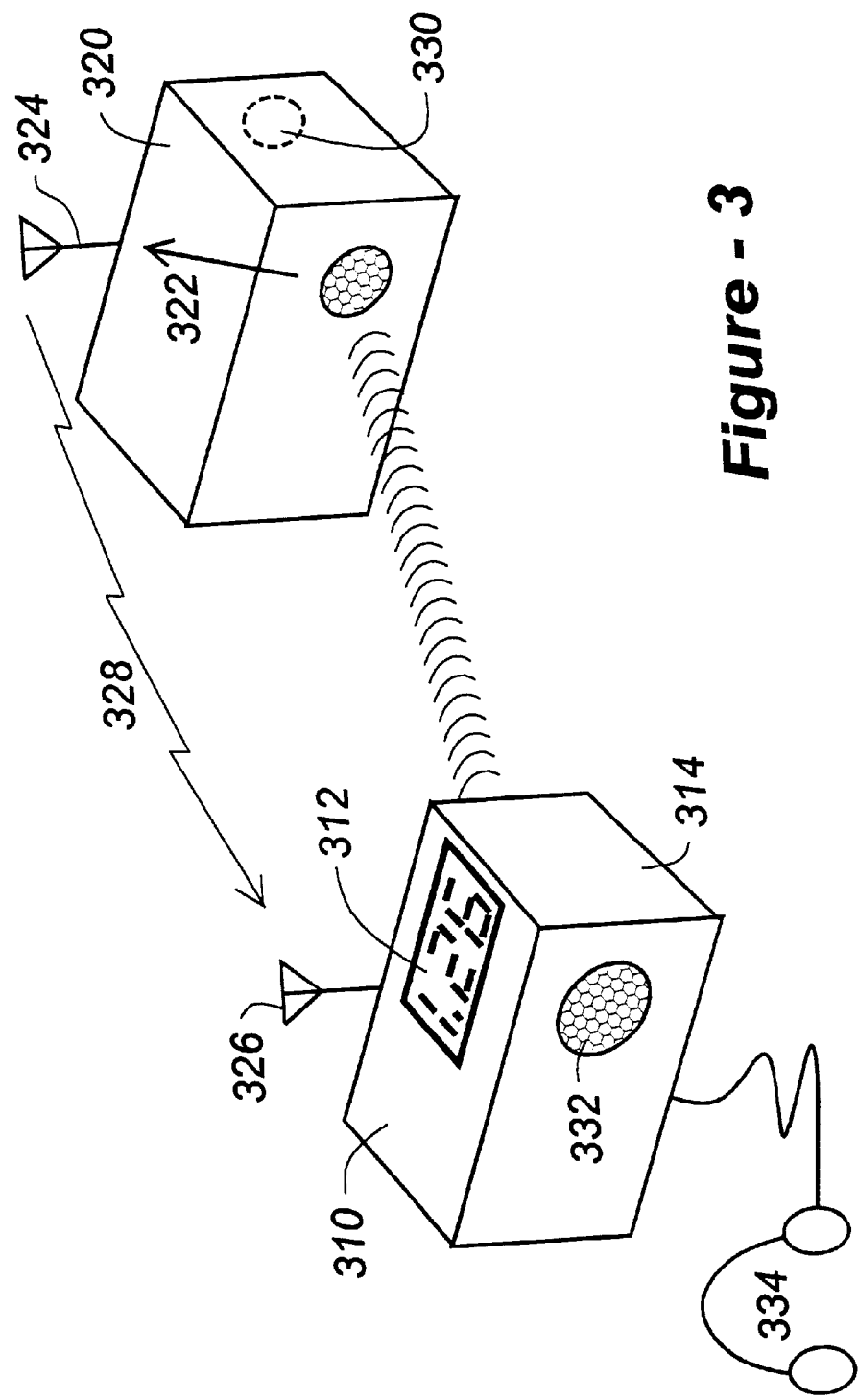
FIG. 3 is a drawing which shows distance-measurement apparatus which utilizes an acoustical signal in one direction and an electromagnetic signal in the opposite direction for range-finding purposes.

Now turning to FIG. 3, there is shown a different embodiment of the invention directed to distance measurement apart from optional picture or sound recording. In this embodiment, a first unit 310 communicates with a second unit 320 so as to determine the distance therebetween for indication, for example, on display 312 associated with the first unit 310. According to this arrangement, an acoustic transducer 314 (not visible in the figure) transmits an acoustic pulse, preferably in the form of an inaudible ultrasonic signal 316 to a pick-up 318 on the unit 320. This signal is modulated onto an RF carrier, as implied by broken line 322, and broadcast via antenna 324 to antenna 326 via electromagnetic signal 328. Within the unit 310, this received signal is demodulated to uncover the modulated acoustic signal, and compared to that transmitted to determine a delay therebetween for use in a distance calculation. This particular embodiment is well-suited to small distance-measurement tasks, such as room dimensioning, architectural planning, and so forth, or measurements over greater distances for use in surveying, for instance. In the event that the units 310 and 320 are sufficient displaced physically that raw voice communication is problematic, the pick-up 318 may be selected so as to detect audible acoustic signals in addition to the ranging pulse(s), in which case the signal 328 may be modulated to include both distance and voice information. At unit 310, the voice information is separated from the distance information and output through speaker 322 or headphones 324. Sound recording is optional in this case. In the event that the pick-up 318 is incapable of detecting both audible inaudible acoustic information, a separate microphone 330 may be added for audible sound detection.

One shortcoming of many distance-sensing systems is their reliance on non-active time-of-flight measurements. In terms of spherical coordinates, these systems may be quite accurate in determining the radial distance, but are relatively inaccurate in determining the angular position (or longitude), since, at beset, they may rely on maximizing the amplitude of the return signal. As such, they easily may be confused by signal cancellation due to reflections and other environmental effects. The angular positioning effect is exacerbated by an accompanying uncertainty in the vertical direction (or co-latitude), with the reseult that the system is effective for lens focusing, but is not satisfactory for the complete function of aiming of the camera.

Figure 4B:
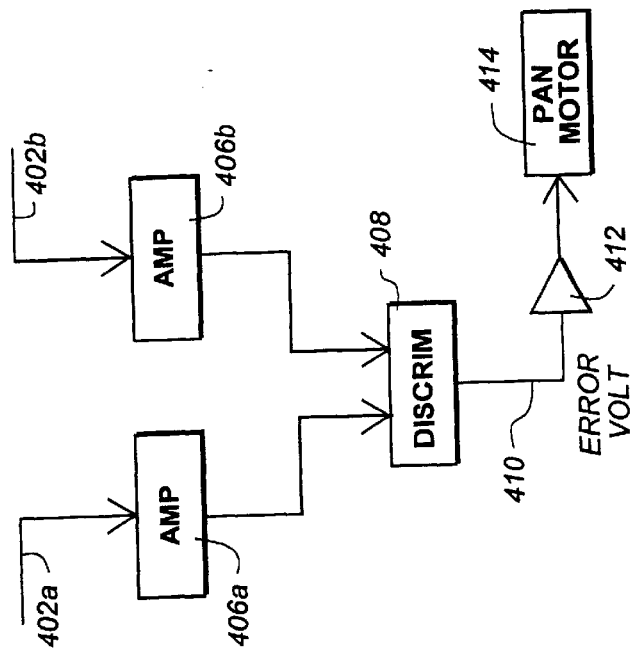
FIG. 4B is a block diagram depicting certain of the control circuity associated with the embodiment of FIG. 4A.
Figure 4A:
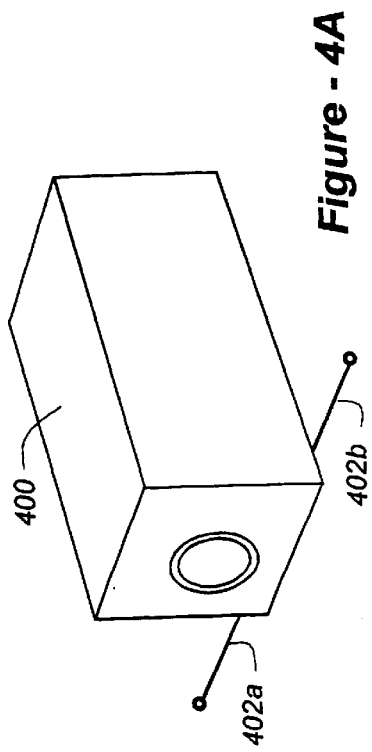
FIG. 4A is a drawing of an embodiment of the invention as seen from an oblique perspective showing how a plurality of antennas may be used in conjunction with a received signal for the purpose of providing an automated camera pan function.

In the instant invention, the received RF signal may serve yet a further purpose. In FIG. 4a, opposite sides of a camera body 400, such that they are preferably perpendicular to the camera body sides, co-linear, and at a 180-degree angle relationship to each other. In FIG. 4b, the electrical signals received by antennas 402a and 402b are conducted to RF-signal amplifiers 406a and 406b, respectively. The outputs of these amplifiers are supplied to a phase-discriminator circuit 408, which develops an error signal 410, the polarity of which is related to the phase error.

With this arrangement, if the camera is pointing to the left of a desired target (bearing an inventive transmitter unit), the circuit 408 will sense the phase difference of the signal as received at the two antennas, and develop a positive voltage having a predetermined polarity. If, on the other hand, the camera is positioned so as to be pointing to the right of the desired target, then the circuit will develop a voltage of the opposite polarity. This error signal is then conducted to the differential amplifier 412, which may be used to drive a pan-control motor (not shown) for the camera mount. This effective creates an electro-mechanical phase-locked loop, which will constantly adjust the camera pan-angle so as to zero-out the phase-error developed at the two antennas. As the transmitter is moved, the camera will pan to keep the transmitter in the center of the field of view.

Figure 5:
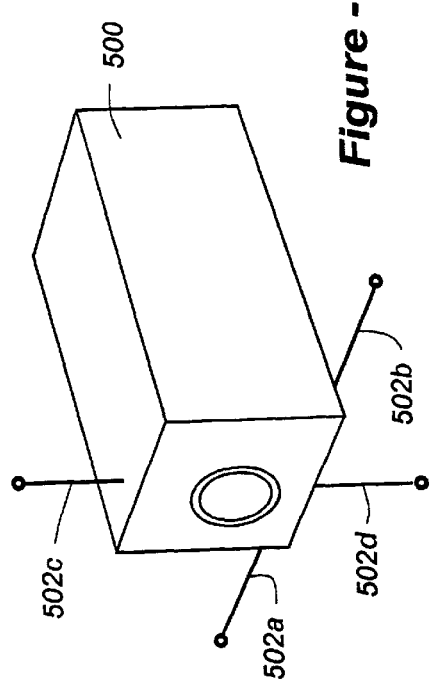
FIG. 5 is a drawing of an embodiment of the invention as seen from an oblique perspective showing how more than two antennas may be used to effect an automatic pan/tilt capability.

In an alternative implementation, shown in FIG. 5, the camera body 500 has been fitted with two antennas, 502a and 502b, as in the previous description in regards to FIG. 4a. However, in this case, the camera body also is fitted with two additional antennas, 502c and 502d, preferably disposed on the top and bottom of the camera body and at right angles to the axis of antennas 502a and 502b. Using a similar circuit to that of FIG. 4b, the phase difference signal may be derived from the top and bottom antennas, and used to drive a tilt motor circuit, which moves the camera in an up/down action in the vertical plane. In this way, both the vertical positioning and the horizontal positioning of the camera may be effected, utilizing the transmitter to provide the required signal from which the necessary phase information may be derived.

It should be noted that many different configurations of the antennas may be utilized to achieve the same effect. For example, instead of four antennas disposed at right angles to each other, three antennas may be disposed at 120-degree angles from each other, and the appropriate phase-difference information derived for controlling the pan and tilt motors. Practitioners skilled in the art will appreciate the applicability of these techniques to the various alternative configurations.

It should be apparent from the embodiments just described with reference to FIGS. 4 and 5 that a camera need only receive a wireless signal from a remote source through multiple antennas in order to achieve an automatic pan or tilt control function. Thus, the signal discrimination and pan/tilt aspects of the invention may be employed with respect to any wireless signal source, including that derived from a conventional remote microphone not equipped with the active range-finding capabilities of the invention. Indeed, the location-finding aspects of the invention made possible through the discrimination of signals received by way of multiple antennas may be used in applications not employing a camera, for example, in monitoring the whereabouts of children, pets, or important or valuable objects equipped with a wireless transmitter.

What is claimed is:

1. Picture and sound recording apparatus coupled to a motorized mount, comprising:
   (a) a camera, including:
      a transmitter for transmitting a ranging signal,
      a receiver for receiving the ranging signal,
      a comparator for comparing the ranging signal as transmitted to the ranging signal as received to determine distance as a function of time-of-flight,
      auto-focussing image-gathering circuitry controllable according to the determined distance,
      circuitry for receiving and demodulating an audio signal, and
      recording circuitry for recording the gathered image and the audio signal;
   (b) a remote unit, including:
      a microphone for detecting the audio signal,
      a radio-frequency transmitter for transmitting an RF carrier modulated with the audio signal to the camera for demodulation and recording, and
      a transponder for receiving the ranging signal from the camera and relaying the signal back to the camera on the same RF carrier as that used to transmit the audio signal; and
   wherein the camera further includes one or more antennas for receiving the RF carrier from the remote unit, and
   discrimination electronics operative to physically move the camera using the mount so as to track the remote unit.

2. The picture and sound recording apparatus of claim 1, wherein the ranging signal transmitted by the camera is an acoustic signal.

3. The picture and sound recording apparatus of claim 1, wherein at least the audio information is frequency modulated onto the RF carrier.

4. The picture and sound recording apparatus of claim 3, wherein the microphone used for detecting the audio signal is also used to detect the acoustic ranging signal.

5. The picture and sound recording apparatus of claim 1, the camera further including a docking station to physically receive the remote unit, the docking station including contacts between the camera and remote unit establishing a hardwired electrical path between the microphone and the circuitry for recording the audio signal.

6. The picture and sound recording apparatus of claim 1, further including a plurality of remote units, and wherein the camera communicates with only one of the units on a selective basis.

7. The apparatus of claim 6, wherein each remote unit transmits a signal to the camera to assist the camera in selecting that remote unit.

8. The picture and sound recording apparatus of claim 7, wherein the signal used to assist the camera in selecting the remote unit is an optical signal.

9. The picture and sound recording apparatus of claim 1, wherein the camera is a video camera.

10. The picture and sound recording apparatus of claim 9, wherein the video camera is a camcorder.

11. The apparatus of claim 1, including two antennas on either side of the camera to effectuate a camera pan function.

12. The apparatus of claim 11, further including at least one antenna above or below the camera to effectuate a camera tilt function.

13. A distance measurement instrument, comprising:
   (a) a first unit, including:
      an acoustic transducer transmitting a ranging signal,
      an RF receiver and demodulator to recover a returned version of the ranging signal, and
      a comparator for comparing the ranging signal as transmitted to the returned version of the ranging signal to determine distance as a function of time-of-flight; and
   (b) a second unit operative to receive the ranging singal and modulate the ranging signal on an RF carrier for reception of the RF receiver of the first unit.

14. The distance measurement instrument of claim 13, wherein the second unit further includes means for detecting and modulating an locally detected audio signal onto the RF carrier, and wherein the first unit includes a demodulator for demodulating the audio signal.

15. The distance measurement of claim 1, wherein the first instrument further includes a display indicative of the determined distance.

* * * * *

UNITED STATES PATENT AND TRADEMARK OFFICE
CERTIFICATE OF CORRECTION

PATENT NO. : 7,317,872 B1  Page 1 of 1
APPLICATION NO. : 09/431510
DATED : January 8, 2008
INVENTOR(S) : John G. Posa et al.

It is certified that error appears in the above-identified patent and that said Letters Patent is hereby corrected as shown below:

In column 3, line 33, delete "and may be use FM" and insert -- and may use FM --, therefor.

In column 6, line 1, delete "along path 253" before "for recording purposes".

In column 6, line(s) 10-11, delete "through transducer 255" and insert -- through a transducer --, therefor.

In column 6, line 30, after "264" insert -- (FIG. 2A) --.

In column 7, line 43, delete "signal 316 to" and insert -- signal to --, therefor.

In column 7, line 43, delete "a pick-up 318 on" and insert -- a pick-up on --, therefor.

In column 7, line(s) 44-45, delete "broken line 322" and insert -- broken line --, therefor.

In column 7, line(s) 60-61, delete "speaker 322" and insert -- speaker 332 --, therefor.

In column 9, line 19, delete "auto-focussing" and insert -- auto-focusing --, therefor.

In column 9, line 23, delete "the gathered image" and insert -- a gathered image --, therefor.

In column 9, line 27, delete "an RF" and insert -- a RF --, therefor.

In column 10, line 30, delete "an RF" and insert -- a RF --, therefor.

In column 10, line 36, delete "singal" and insert -- signal --, therefor.

In column 10, line 41, delete "an locally detected" and insert -- a locally detected --, therefor.

Signed and Sealed this

Thirtieth Day of November, 2010

David J. Kappos
*Director of the United States Patent and Trademark Office*